United States Patent
Shen et al.

(10) Patent No.: US 11,988,199 B2
(45) Date of Patent: May 21, 2024

(54) POWER GENERATING DEVICE AND OPERATION METHOD THEREOF BASED ON OCEAN TEMPERATURE DIFFERENCE

(71) Applicant: HUAZHONG UNIVERSITY OF SCIENCE AND TECHNOLOGY, Hubei (CN)

(72) Inventors: Yue Shen, Hubei (CN); Jiangjiang Duan, Hubei (CN); Jintao Meng, Hubei (CN); Zhe Deng, Hubei (CN); Xueting Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/010,808

(22) PCT Filed: Aug. 11, 2022

(86) PCT No.: PCT/CN2022/111711
§ 371 (c)(1),
(2) Date: Dec. 16, 2022

(87) PCT Pub. No.: WO2023/029933
PCT Pub. Date: Mar. 9, 2023

(65) Prior Publication Data
US 2023/0340947 A1 Oct. 26, 2023

(30) Foreign Application Priority Data

Sep. 1, 2021 (CN) .......................... 202111023095.5
Jul. 16, 2022 (CN) .......................... 202210834703.9

(51) Int. Cl.
*F03G 7/05* (2006.01)

(52) U.S. Cl.
CPC ..................................... *F03G 7/05* (2013.01)

(58) Field of Classification Search
CPC ........ F03B 13/26; F03B 13/16; F03B 13/188; F03B 13/1885; F03B 13/20; F03B 15/00;
(Continued)

(56) References Cited

U.S. PATENT DOCUMENTS 4,027,479 A * 6/1977 Cory ....................... F03G 7/065
60/527
4,333,312 A 6/1982 Sorensen
(Continued)

FOREIGN PATENT DOCUMENTS

| CN | 101045797 | 10/2007 |
| CN | 107304754 | 10/2017 |
| EP | 1767779 | 3/2007 |

OTHER PUBLICATIONS

"International Search Report (Form PCT/ISA/210) of PCT/CN2022/111711," mailed on Nov. 11, 2022, pp. 1-5.
(Continued)

*Primary Examiner* — Shafiq Mian
(74) *Attorney, Agent, or Firm* — JCIPRNET

(57) ABSTRACT

The invention discloses a power generating device and an operation method thereof based on ocean temperature difference, which belong to the field of ocean energy utilization, and include a negative thermal expansion body, a rope and a generator. The negative thermal expansion body is connected to the rope, and the rope is connected to the generator simultaneously. The negative thermal expansion body is in a contracted state when in the hotter upper seawater close to the sea surface, and the difference obtained by deducting buoyancy from gravity is relatively large. The negative thermal expansion body is in an expanded state when in colder deep seawater, and the difference obtained by deducting buoyancy from gravity is relatively small. The unbalanced force on the rope will drive the rope to move,
(Continued)

and the generator will be driven to generate power through the rope.

20 Claims, 6 Drawing Sheets

(58) Field of Classification Search
CPC ...... F03B 13/24; F03B 13/1845; F03B 13/14; F03B 13/142; F05B 2240/93; F05B 2260/4031; F05B 2220/706; F05B 2240/97; F05B 2280/5001; Y02E 10/38; Y02E 10/32
See application file for complete search history.

(56) References Cited

U.S. PATENT DOCUMENTS

| 2013/0205768 A1* | 8/2013 | Kim | F03B 17/00 |
| | | | 60/495 |
| 2014/0298796 A1* | 10/2014 | Dunn | F03B 17/025 |
| | | | 60/531 |
| 2020/0224631 A1* | 7/2020 | Droche | F03B 13/14 |

OTHER PUBLICATIONS

"Written Opinion of the International Searching Authority (Form PCT/ISA/237) of PCT/CN2022/111711," mailed on Nov. 11, 2022, pp. 1-5.

\* cited by examiner

POWER GENERATING DEVICE AND OPERATION METHOD THEREOF BASED ON OCEAN TEMPERATURE DIFFERENCE

CROSS-REFERENCE TO RELATED APPLICATION

This application is a 371 of international application of PCT application serial no. PCT/CN2022/111711, filed on Aug. 11, 2022, which claims the priority benefit of China pplication no. 202210834703.9, filed on Jul. 16, 2022, and the priority benefit of China application no. 202111023095.5, filed on Sep. 1, 2021. The entirety of each of the above mentioned patent applications is hereby incorporated by reference herein and made a part of this specification.

TECHNICAL FIELD

The disclosure belongs to the field of generating power based on ocean temperature difference, and more specifically relates to a power generating device and an operation method thereof based on ocean temperature difference.

DESCRIPTION OF RELATED ART

It is known that the temperature of seawater in the ocean changes with depth, especially in low-latitude regions, where the surface temperature of seawater is higher, while the water temperature decreases with depth. At a depth of 200 meters under the sea, the water temperature is normally 10° C. lower than the surface water temperature. The temperature difference of seawater may be utilized to generate power.

At present, the main idea of using seawater temperature difference to generate power still follows the conventional method which utilizes evaporation of liquid working fluid to drive turbines to generate power. Specifically, there are basically two types of power generating devices: one type of power generating device is closed type, and the energy conversion efficiency of the closed cycle system is 3.3% to 3.5%. If the energy consumption of the pump is excluded, the net efficiency is 2.1% to 2.3%. The second type of power generating device is open type, and the energy conversion efficiency of the open system is higher than that of the closed system, but not suitable for large-capacity power generation.

Generally speaking, conventional seawater-temperature-difference-based power generating devices relying on the evaporation of working fluid generally have defects such as requirement for large temperature difference (at least temperature difference of 20° C.), low power generating efficiency, and insufficient durability of materials in seawater, and such method is difficult to be adapted to large-scale commercialization. Therefore, it is necessary to develop a power generating device or method based on ocean temperature difference with higher power generating efficiency.

SUMMARY

In view of the defects of the related art, the purpose of the present disclosure is to provide a power generating device and an operation method thereof based on ocean temperature difference, which are based on a brand-new idea and utilize the thermal expansion or contraction effect of a specific substance to change the volume of the substance. By doing so, it is possible to change buoyancy and convert buoyancy variance into mechanical energy to realize power generation. The concept is ingenious and the utilization efficiency of energy is very high.

In order to achieve the above purpose, in an aspect of the present disclosure, a power generating device based on ocean temperature difference is provided, which includes a negative thermal expansion body, a rope and a generator. The negative thermal expansion body is connected with the rope, and the rope is connected with the generator. The negative thermal expansion body is in a contracted state in the hotter upper seawater close to the sea surface, and the difference obtained by gravity minus buoyancy is relatively large. The negative thermal expansion body is in an expanded state in the colder deep seawater, and the difference obtained by gravity minus buoyancy is relatively small. During the operation process, the negative thermal expansion body in the colder deep seawater becomes expanded and buoyant after a long time of sufficient heat exchange, or prepare to become expanded and gradually become truly expanded during floating up in order to be able to gradually increase the buoyancy in the process of floating up. When the negative thermal expansion body floats up to the hotter upper seawater, after a long time of sufficient heat exchange, the negative thermal expansion body changes back to the contracted state, the buoyancy becomes smaller, and the negative thermal expansion body sinks back into the deep seawater. During the above-mentioned floating and sinking process, the total work done by the resultant force of gravity and buoyancy is positive, and the negative thermal expansion body floats or sinks in seawater to drive the rope to move, and the generator is pulled by the rope to realize power generation.

In another aspect of the present disclosure, a power generating device based on ocean temperature difference is further provided, which includes a fixing pulley, negative thermal expansion bodies, a rope, and a generator. Both ends of the rope are respectively provided with the same negative thermal expansion body, the rope is wound on the fixing pulley and movable along the fixing pulley. The fixing pulley is connected to the generator. The negative thermal expansion body is in a contracted state in the hotter upper seawater close to the sea surface, and the difference obtained by gravity minus buoyancy is relatively large. The negative thermal expansion body is in an expanded state in the colder deep seawater, and the difference obtained by gravity minus buoyancy is relatively small. During the operation process, the negative thermal expansion bodies on both sides of the rope have varied differences obtained by deducting buoyancy from gravity due to their temperature differences, thus driving the rope to move, and then drives the fixing pulley to rotate to realize power generation.

Further, each of the negative thermal expansion bodies is connected with a heavy object, and the average density of the combination of the heavy object and each of the negative thermal expansion bodies is always greater than the density of seawater. The fixing pulley and the generator are set above and near the sea surface. During the initial power generation process, the negative thermal expansion bodies at both ends of the rope are located at the ocean surface and in deep ocean respectively. The negative thermal expansion body on one side of the rope is in the ocean surface with higher temperature. After a long time of sufficient heat exchange, the negative thermal expansion body is at a relatively high-temperature state, its volume shrinks, which makes its own buoyancy smaller. The negative thermal expansion body on the other side of the rope is located in the deep ocean. After a long time of sufficient heat exchange, the negative thermal expansion body is at a relatively low-temperature state, its volume is expanded, which makes its own buoyancy larger, and results in unbalanced force on both sides of the rope, making the rope move and realize power generation. The above process is repeated to make the rope move up and down repeatedly, thereby realizing continuous power generation.

Further, the generator is placed on the seabed, the fixing pulley is connected to the rotor of the generator, and both ends of the rope are respectively provided with the same negative thermal expansion body. The density of the negative thermal expansion body is less than that of seawater. During the initial power generation process, the negative thermal expansion bodies at both ends of the rope are located at the ocean surface and in deep ocean respectively. The negative thermal expansion body on one side of the rope is in the ocean surface with higher temperature. After a long time of sufficient heat exchange, the negative thermal expansion body is at a relatively high-temperature state, its volume shrinks, which makes its own buoyancy smaller. The negative thermal expansion body on the other side of the rope is located in the deep ocean. After a long time of sufficient heat exchange, the negative thermal expansion body is at a relatively low-temperature state, its volume is expanded, which makes its own buoyancy larger, and results in unbalanced force on both sides of the rope, making the rope move to drive the fixing pulley to rotate and realize power generation. The above process is repeated to make the rope move up and down repeatedly, thereby realizing continuous power generation.

Furthermore, the negative thermal expansion bodies on both sides of the rope are a piston set structure. The piston set structure includes an airtight piston, a water-permeable piston, a beam, and a hollow steel ball. The airtight piston and the water-permeable piston are arranged in parallel between the two beams and perpendicular to the beams, and the piston bars of the airtight piston and the water-permeable piston are fixed on the same beam. The bottoms of the airtight piston and the water-permeable piston are also fixed on another beam. The piston chamber of the airtight piston is in a vacuum state or filled with gas. The piston chamber of the water-permeable piston is filled with a thermosensitive polymer. The thermosensitive polymer has a water-absorbing and swelling characteristic at a relatively low-temperature state and has a water-dehydrating and contracting characteristic at a relatively high-temperature state. The hollow steel ball is located on the top of one of the beams. By controlling the volume of the hollow steel ball, the density of the entire piston set structure is designed to be less than that of seawater. The advantage of this design is that the generator is fixed on the seabed, and the power generated may be output directly through the submarine cable without the need to build an additional platform above sea surface.

Further, the negative thermal expansion bodies on both sides of the rope are a piston set structure. The piston set structure includes an airtight piston, water-permeable pistons a beam, and springs. The airtight piston, the water-permeable pistons, and the springs are arranged in parallel between the two beams and perpendicular to the beams, and the piston bars of the airtight piston and the water-permeable pistons are fixed on the same beam. The bottoms of the airtight piston and the water-permeable piston are also fixed on another beam. The piston chamber of the airtight piston is in a vacuum state or filled with gas. The piston chamber of the water-permeable pistons is filled with a thermosensitive polymer. The thermosensitive polymer has a water-absorbing and swelling characteristic at a relatively low-temperature state and has a water-dehydrating and contracting characteristic at a relatively high-temperature state.

Furthermore, the material of the negative thermal expansion bodies on both sides of the rope is gallium-indium alloy, the mass fraction of indium in the gallium-indium alloy is 5% to 19%, the melting point is between 5° C. and 25° C. In the melting process of gallium-indium alloy, about 3% of the volume is contracted, and the solidification process is reversible.

Moreover, the thermosensitive polymer is a cross-linked copolymer of N-isopropylacrylamide and N-tert-butylacrylamide in the form of gel particles.

Further, the number of water-permeable pistons is two, and the number of springs is two. The two water-permeable pistons are respectively arranged on both sides of an airtight piston, and the two springs are also respectively arranged on both sides of the airtight piston, and are located between the airtight piston and the water-permeable piston.

Furthermore, a small hole is opened at the bottom of the water-permeable piston for the seawater to pass through. A porous ceramic water-permeable layer is also arranged at the bottom of the water-permeable piston. The porous ceramic water-permeable layer covers the hole, and is provided to isolate the thermosensitive polymer in the piston chamber of the water-permeable piston from marine environments. The pore diameter of the porous ceramic water-permeable layer is smaller than the diameter of the particles of the thermosensitive polymer.

Moreover, the diameter of the piston chamber of the airtight piston is larger than the diameter of the piston chamber of the water-permeable piston.

Further, the rope is made of polyethylene fishing line.

Moreover, a negative thermal expansion body is provided, which includes a flexible and elastic deformable container, and a phase-change material accommodated in the deformable container and crystallized when cooled and may change from a liquid state to a solid state. The liquid phase-change material has soluble gas dissolved therein. The crystallization temperature of the phase-change material is between 4° C. and 40° C. The phase-change material is crystallized when its temperature is lowered, and the soluble gas in the phase-change material is emitted, which causes the total volume of the deformable container expands. The crystallized phase-change material melts into a liquid state when its temperature rises, and dissolves and absorbs the emitted gas into the phase-change material itself, which causes the total volume of the deformable container to contract.

Furthermore, the phase-change material is one or more of sulfolane, ethylene carbonate, capric acid, dimethyl sulfoxide, lauryl alcohol and low-melting point paraffin, and the low-melting point paraffin refers to C18 paraffin.

Moreover, the soluble gas includes one or more of carbon dioxide, methane, ethane and propane. The mass of the dissolved and absorbed soluble gas is greater than 20% of the maximum solubility of the soluble gas at the melting point of the corresponding phase-change material.

Further, the deformable container is an aluminum-plastic film, a rubber bag or a syringe needle.

Moreover, the phase-change material is a gel at a set temperature, and there is a liquid at a microscopic level in the gel. For example, in the condensation system formed by cross-linked poly N-isopropylacrylamide and ethylene carbonate, at 30° C., the molecules of ethylene carbonate therein is movable at the microscopic level, which is equivalent to a liquid at the microscopic level. The condensation system may also dissolve carbon dioxide gas, and at 10° C., the molecules of ethylene carbonate crystallize, and the dissolved carbon dioxide molecules precipitate out and expand in volume. Explanation: At the microscopic level, the gel is composed of a three-dimensional polymer skeleton and liquid molecules between the skeletons. When it is cold, the gel may also undergo a phase transition, and the liquid molecules therein crystallize, and the dissolved gas molecules precipitate out. The use of gelled liquid brings the following advantages: the macroscopic state of gelled liquid is solid, so it is possible to maintain a large specific surface area, and will not change into the shape with the smallest specific surface area under the action of surface tension like a liquid, which facilitates rapid gas absorption at a high temperature.

Furthermore, the deformable container is further accommodated with a porous material, and the phase-change material is filled in the pores of the porous material. The porous material is, for example, glass fiber, and the phase-change material is infiltrated in the pores of the porous material. Explanation: When it is cold, the molecules of the phase-change material crystallize, and the molecules of dissolved gas precipitate out. The use of porous materials will bring the following advantageous: the structure of the porous material allows the liquid infiltrate in its pores, thereby increasing the area of the gas-liquid interface, which facilitates rapid gas absorption at a high temperature.

In still another aspect of the present disclosure, an operation method of a power generating device based on ocean temperature difference is further provided. During the operation process, the negative thermal expansion body is in a relatively hot upper seawater near the sea surface, the phase-change material is in a liquid state, and the soluble gas is dissolved therein. The negative thermal expansion body is in a contracted state as a whole with a small volume and small buoyancy. The difference between gravity and buoyancy remains constant, and the difference is large. In the colder deep seawater, the phase-change material crystallizes, the soluble gas is emitted, the soluble gas is compressed by the deep seawater, and the volume of the entire negative thermal expansion body changes slightly. As the negative thermal expansion body gradually floats up, the seawater pressure decreases, the volume of the compressed soluble gas gradually expands, the buoyancy increases, and the difference between gravity and buoyancy decreases gradually.

In yet another aspect of the present disclosure, an operation method of a power generating device based on ocean temperature difference is further provided, including: S1: Setting the negative thermal expansion body at one end of the rope at the sea surface, setting the negative thermal expansion body at the other end of the rope in the deep ocean, fixing the fixing pulley, and waiting for the set time length; S2: Measuring the tension on the ropes on both sides of the fixing pulley, after the tension on both sides is stable, releasing the fixation on the fixing pulley so that the fixing pulley may rotate freely under the action of the ropes to perform the first cycle of power generation; S3: After the rope completes a full-cycle of movement, the first cycle of power generation is completed, switching the positions of the negative thermal expansion bodies on both sides of the rope in the seawater, fixing the fixing pulley, and waiting for the set time length until the tension on the ropes on both sides of the fixing pulley remains unchanged; S4: Releasing the fixing pulley, the rope moves, and the second cycle of power generation is performed; repeating steps S2 and S3 to realize continuous power generation.

Generally speaking, compared with the related art, the above technical solution conceived by the present disclosure has the following advantageous effects:

The disclosure has a novel concept, and utilizes the special effect of "thermal expansion or contraction" of material. The object is contracted in the surface seawater, when the buoyancy decreases, the object sinks; when the object is in the deep seawater, the object is expanded and the buoyancy increases, the object floats up, and so on, so that work may be performed. The fixing pulley and the rope are designed, and both sides of the rope are provided with the negative thermal expansion body, so that the work of the floating and sinking process caused by the volume change of the negative thermal expansion body is transferred to the generator through the fixing pulley to realize power generation. The structure is simple and has high power generation efficiency. The cross-linked copolymer of gallium-indium alloy and N-isopropylacrylamide and N-tert-butylacrylamide is selected as the negative thermal expansion body. The material is cleverly selected, and better adapted to environments with different temperatures at different depths in the ocean. To sum up, the overall disclosure concept of the present disclosure is novel, the structural design is ingenious, and the engineering transformation value is considerable.

DESCRIPTION OF THE EMBODIMENTS

Figure 1:
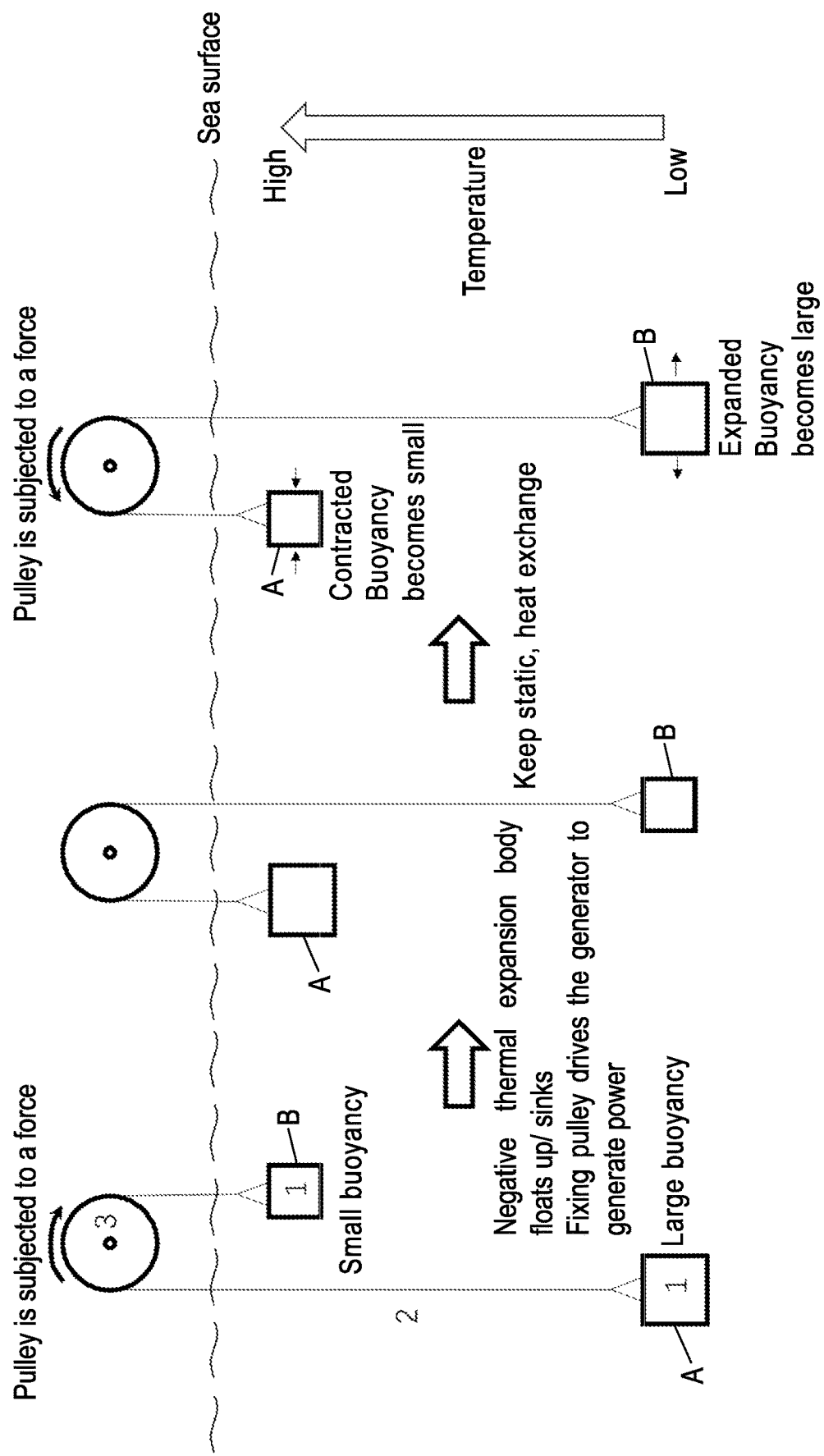
FIG. 1 is a schematic diagram of the occurrence process of thermal expansion or contraction when the negative thermal expansion body in the ocean-temperature-difference-based power generating device of the first example of the present disclosure adopts gallium-indium alloy.

In order to make the purpose, technical solution and advantages of the present disclosure more comprehensible, the present disclosure will be further described in detail below in conjunction with the accompanying drawings and embodiments. It should be understood that the specific embodiments described here are only used to explain the present disclosure, not to limit the present disclosure.

The device of the present disclosure is a concept that is very different from the conventional method in that the device utilizes seawater temperature difference to generate power. By using the "thermal expansion or contraction"

effect of one or some special substances or structures to make the special substance move up and down repeatedly in seawater, it is possible to drive the generator to generate power. An object in a temperature range corresponding to the surface seawater and the deep seawater has the characteristics of thermal expansion or contraction. The object is contracted in the surface seawater, its buoyancy decreases and sinks. When the object is in the deep seawater, the object is expanded, its buoyancy increases and floats up. By repeating this cycle, it is possible to perform work and generate power.

In the present disclosure, the device for generating power by using ocean temperature difference includes a negative thermal expansion body. The negative thermal expansion body is in a high-temperature state through heat exchange in the ocean surface with a relatively high temperature, has a small volume and a small buoyancy, and the work done during the sinking process is W1. After the object sinks to the deep ocean with a relatively low temperature, the object is in a low-temperature state through heat exchange, its volume expands, and its buoyancy increases, and the work consumed to push the object back to the ocean surface is W2, then W1>W2. By moving the object up and down repeatedly, net energy is output, which drives the generator to generate electric energy.

The device of the present disclosure includes, for example, at least two negative thermal expansion body, whose average density is always greater than that of seawater (in the deep ocean, under the expanded state due to coolness, the average density of the negative thermal expansion body is still greater than the seawater density, and in the ocean surface, under the contracted state due to heat, the average density of the negative thermal expansion body is still greater than the seawater density). The two negative thermal expansion body are connected by a rope, and the rope is connected to the fixing pulley on the sea surface to drive the fixing pulley to rotate when the rope rises or sinks. When one negative thermal expansion body moves up, the other negative thermal expansion body moves down correspondingly. The fixing pulley is connected to the generator, so that the mechanical energy of the fixing pulley during the rotation process may be converted into electrical energy, thereby driving the generator to generate power. In practice, as long as the value of the gravity minus the buoyancy of the negative thermal expansion body in the high-temperature state is greater than the value of the gravity minus the buoyancy of the negative thermal expansion body in the low-temperature state, the fixing pulley may be driven to move. The average density of the negative thermal expansion body at low-temperature state does not have to be lower than that of seawater to make the negative thermal expansion body float up to drive the fixing pulley. In the present disclosure, the density of the two negative thermal expansion body is greater than that of seawater no matter in the ocean surface or in the deep ocean.

The key of the present disclosure lies in selection of the one with significant thermal expansion or contraction characteristics when in a temperature range between 5° C. and 25° C. Among pure substances, gallium-indium alloys with an indium content between 5% and 19% meet the requirements. The melting point of gallium-indium alloys is between 5° C. and 25° C., and the about 3% of its volume is contracted in the melting process, and the solidification process is reversible. Specifically, a gallium-indium alloy with an indium content of 10% may be selected, and its melting point is 20° C. 3% of its volume will be contracted during heating and melting, and 3% of its volume will be expanded during cooling and solidification.

Gallium-indium alloys, however, are expensive and unlikely to be used on a large scale. There are many polymer materials that will swell or dehydrate due to changes in hydrophilic and hydrophobic properties between 5° C. and 25° C. For example, in the case of a cross-linked copolymer of N-isopropylacrylamide and N-tert-butylacrylamide, at a high temperature, a polymer chain exhibits hydrophobic properties, and the overall volume of the polymer particles is smaller; at a low temperature, the polymer chains exhibit hydrophilic properties, and the polymer particles swell and increase significantly in volume. The swelling process of such polymer is different from the thermal expansion or contraction occurred to the gallium indium alloy when reaching the melting point. The swelling process takes place along with material exchange with the outer environment, and does not bring about significant changes in the difference obtained by deducting the "gravity from buoyancy" of the polymer gel itself. However, it is possible to utilize the swelling force to pull the additional structure, so that the polymer is expanded in volume, thereby causing the significant difference obtained by deducting the "gravity from buoyancy". With such a design, the concept of the present disclosure may also be realized.

Specifically, the negative thermal expansion body includes an airtight piston, a water-permeable piston, a beam, a spring, and a thermosensitive polymer. Both ends of the airtight piston are connected to the water-permeable piston through a beam to form a linkage structure. Springs are disposed between the beams at both ends of the piston to facilitate the contraction of the airtight piston and the water-permeable piston at the ocean surface. The movement of the water-permeable piston will drive the airtight piston to move synchronously. The water-permeable piston is filled with thermosensitive polymer, which may be permeated by seawater without leaking the thermosensitive polymer. The thermosensitive polymer is in the form of gel particles, which absorb water and swell at low temperature, and dehydrate and contract at high temperature. The airtight piston has good sealing performance, and the inside of the piston is in a vacuum state or filled with gas. In the deep ocean, the thermosensitive polymer absorbs water and swells, driving the water-permeable piston to expand, synchronously pulling the piston cover of the airtight piston to increase the volume of the airtight piston, and the buoyancy of the negative thermal expansion body increases. At the ocean surface, the thermosensitive polymer dehydrates and contracts, and the spring restores to drive the water-permeable piston to contract, synchronously pulling the piston cover of the airtight piston, so that the volume of the internal vacuum chamber or gas chamber of the airtight piston is reduced, so that the volume of the negative thermal expansion body is decreased, and the buoyancy of the negative thermal expansion body is reduced.

In practice, the generator may also be provided at the bottom of the ocean. When the generator is disposed at the bottom of the ocean, the structure of the piston set needs to be improved synchronously. The density of the entire piston set structure needs to be lower than that of seawater, so a hollow steel ball with a suitable volume may be disposed in the original piston set structure in order to decrease the density of the entire piston set structure so that the density of the entire piston set structure is lower than that of seawater.

In order to describe the device of the present disclosure in more detail, more description is provided below in conjunction with specific examples.

First Example
Seawater-Temperature-Difference-Based Power Generating Device Utilizing gallium indium alloy with Thermal Expansion or Contraction Characteristics As shown in FIG. 1, the two thermally-expandable or contractible bodies 1 shown are 1 Kg of gallium-indium alloy blocks wrapped in two sealed plastic films, which are respectively defined as thermally-expandable or contractible bodies A and B, in which the content of indium is 10% and its melting point is 20° C. A rope 2 is made of PE fishing line with a diameter of 0.2 mm, with a total length of 202 meters, of which 2 meters are exposed above the sea surface. The test was carried out in the ocean near the Paracel Islands at 113° east longitude and 17° north latitude. The sea surface temperature was 29° C., and the temperature at a depth of 200 meters was 15° C. The negative thermal expansion body A was sank to a depth of 200 meters, and the negative thermal expansion body B was hung over the ocean surface. The fixing pulley 3 was connected with a small DC generator. Initially, the fixing pulley was stuck, and after waiting for 30 minutes, a spring balance was adopted to measure that the tension of the fishing line on the negative thermal expansion body B side is 0.05 N greater than that of the fishing line on the negative thermal expansion body A side. Thereafter, the fixing pulley was released, the negative thermal expansion body B was sank, and the negative thermal expansion body A floated up, driving the fixing pulley to rotate, and the generator generated power, and the power enables a 1 mW LED bulb to light up. After 68 seconds, the negative thermal expansion body A floated to the sea surface, its temperature was still very low, and only a small amount of gallium-indium alloy on the surface melted. The fixing pulley was stuck, and after 30 minutes, the gallium-indium alloy in the negative thermal expansion body A was completely melted, and the tension of the fishing line on the negative thermal expansion body A side is 0.05 N greater than that of the fishing line on the negative thermal expansion body B side. Thereafter, the fixing pulley was released, and power may be generated again.

Figure 2:
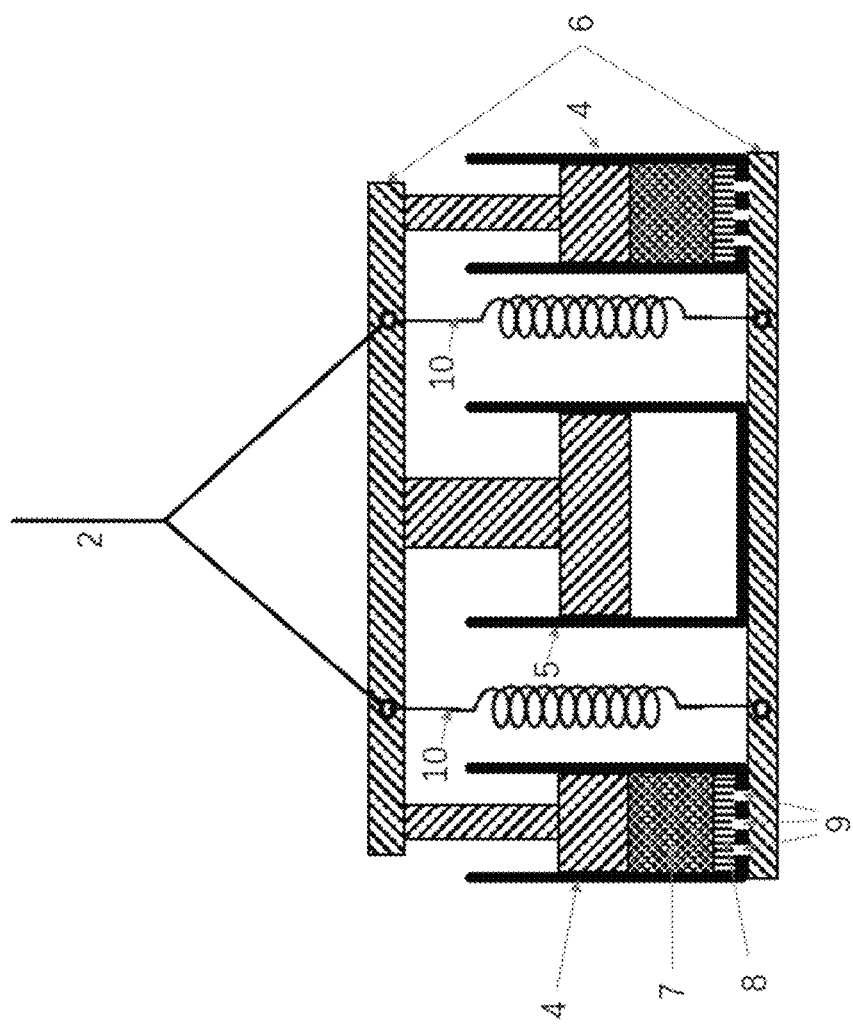
FIG. 2 is a schematic diagram of the specific composition of the piston set structure when the negative thermal expansion body in the ocean-temperature-difference-based power generating device of the second example of the present disclosure adopts the piston set structure, and the generator is arranged near the sea surface.

Second Example
Seawater-Temperature-Difference-Based Power Generating Device Utilizing Cross-Linked poly(N-isopropylacrylamide) with Thermosensitive Swelling Characteristics The overall structure of the device is still as shown in FIG. 1, and the two thermally-expandable or contractible bodies are still defined as A and B respectively, but these two thermally-expandable or contractible bodies become the structure shown in FIG. 2. Each negative thermal expansion body contains two water-permeable pistons 4 with an inner diameter of 10 cm, one airtight piston 5 with an inner diameter of 12 cm, two springs, and two beams 6 composed of 5# channel steel. Both ends of all the pistons are respectively welded and fixed between the two beams. Both ends of the spring 10 are also connected to the two beams to form an additional tension between the two beams. There are twelve water-permeable holes 9 with a diameter of 1 mm drilled at the bottom of the water-permeable piston, and the water-permeable holes are covered with a porous ceramic water-permeable layer 8 with a thickness of 8 mm. The average pore size of the porous ceramic water-permeable layer is 1 μm. The water-permeable piston is filled with cross-linked copolymer particles of N-isopropylacrylamide and N-tert-butylacrylamide, which are used as a thermosensitive polymer 7. The preparation method is as follows:

The N-tert-butylacrylamide monomer and N-isopropylacrylamide monomer were mixed at a molar ratio of 1:9, dissolved in water with a certain volume to prepare a solution with a total monomer concentration of 3 mol/L. Then, ultraviolet photoinitiator 2-hydroxy-4'-(2-hydroxyethoxy)-2-methylacetophenone and a crosslinking agent N,N-methylenebisacrylamide were added to the monomer solution. The molar ratio of the monomer to the initiator is 1:0.001; the molar ratio of the monomer to the crosslinking agent is 1:0.01; the solution prepared above was put into a sealed oxygen-insulated transparent container for 2 hours to initiate polymerization by ultraviolet light, and a thermally-expandable or contractible cross-linked copolymer bulk hydrogel was obtained. Finally, the prepared bulk gel was crushed into hydrogel particles with an average particle size of about 200 μm by a crusher.

The above copolymer particles undergo a sudden change in hydrophilicity and hydrophobicity at 25° C., undergo dehydration and contraction at a temperature above 25° C., and undergo water absorption and swelling below 25° C. Each water-permeable piston is filled with 1 Kg of cross-linked copolymer particles of N-isopropylacrylamide and N-tert-butylacrylamide. The rope is made of 8-strand braided PE fishing line with a diameter of 0.3 mm and a total length of 202 meters.

The test was carried out in the ocean near the Paracel Islands at 113° east longitude and 17° north latitude. The sea surface temperature was 29° C., and the temperature at a depth of 200 meters was 15° C. The negative thermal expansion body A was sank to a depth of 200 meters, and the negative thermal expansion body B was hung over the ocean surface. The fixing pulley was connected with a small DC generator. Initially, the fixing pulley was stuck, and after waiting for 30 minutes, a spring balance was adopted to measure that the tension of the fishing line on the negative thermal expansion body B side is 40 N greater than that of the fishing line on the negative thermal expansion body A side. Thereafter, the fixing pulley was released, the negative thermal expansion body B was sank, and the negative thermal expansion body A floated up, driving the fixing pulley to rotate, and the generator generated power, the output power was approx. 90 W. After 72 seconds, the negative thermal expansion body A floated up to the sea surface, its temperature was still very low, and its volume was still relatively large. The fixing pulley was stuck, and after 30 minutes of heat exchange, the cross-linked copolymer particles of N-isopropylacrylamide and N-tert-butylacrylamide in the negative thermal expansion body A was dehydrated and contracted. Under the action of the spring, both the water-permeable piston and the airtight piston were contracted. Under the circumstances, the tension of the fishing line on the negative thermal expansion body A side is 40 N greater than that of the fishing line on the negative thermal expansion body B side. Thereafter, the fixing pulley was released, and power may be generated again.

Figure 3:
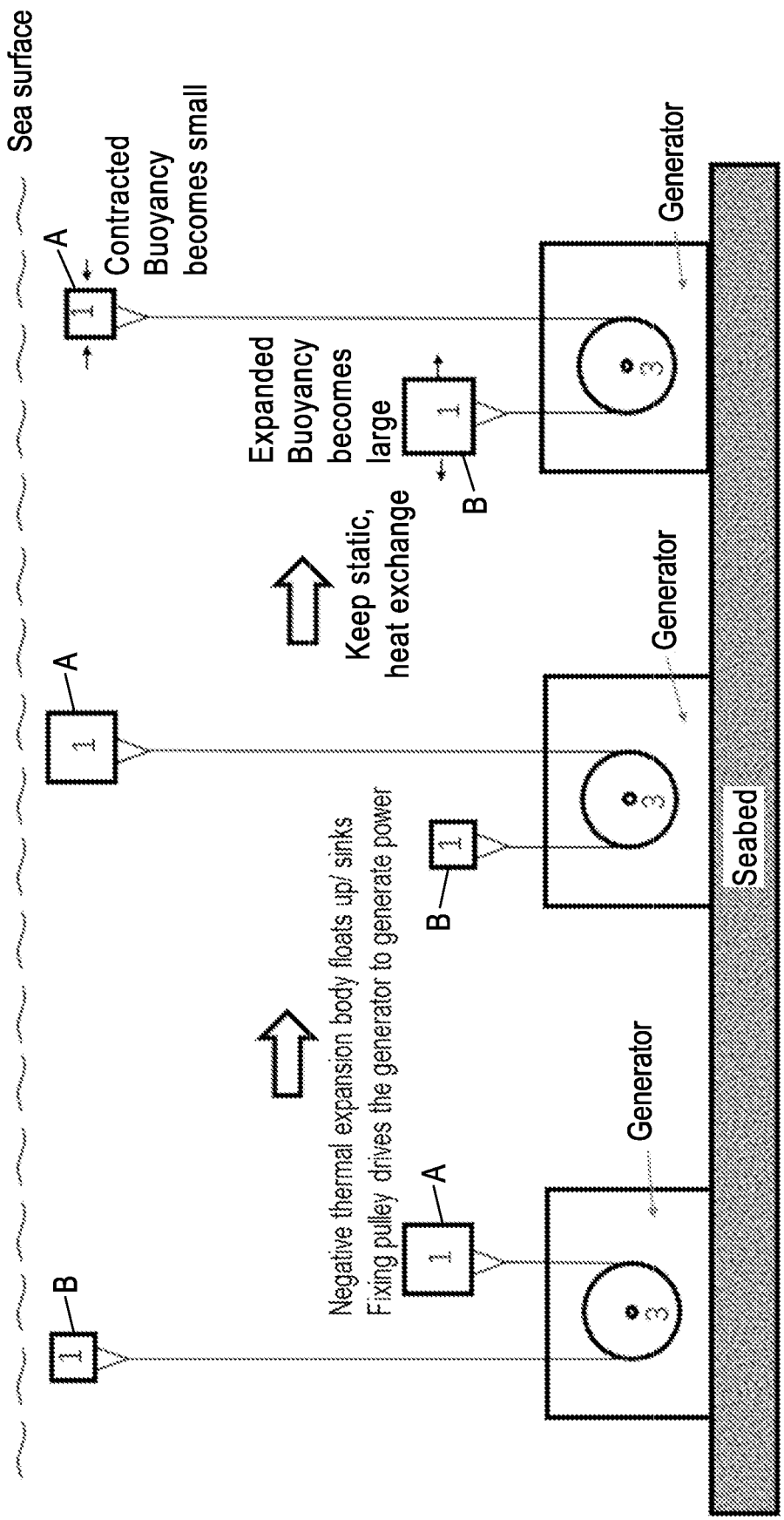
FIG. 3 is a schematic diagram of the structure of the generator in the ocean-temperature-difference-based power generating device of the third example of the present disclosure when being arranged on the seabed.
Figure 4:
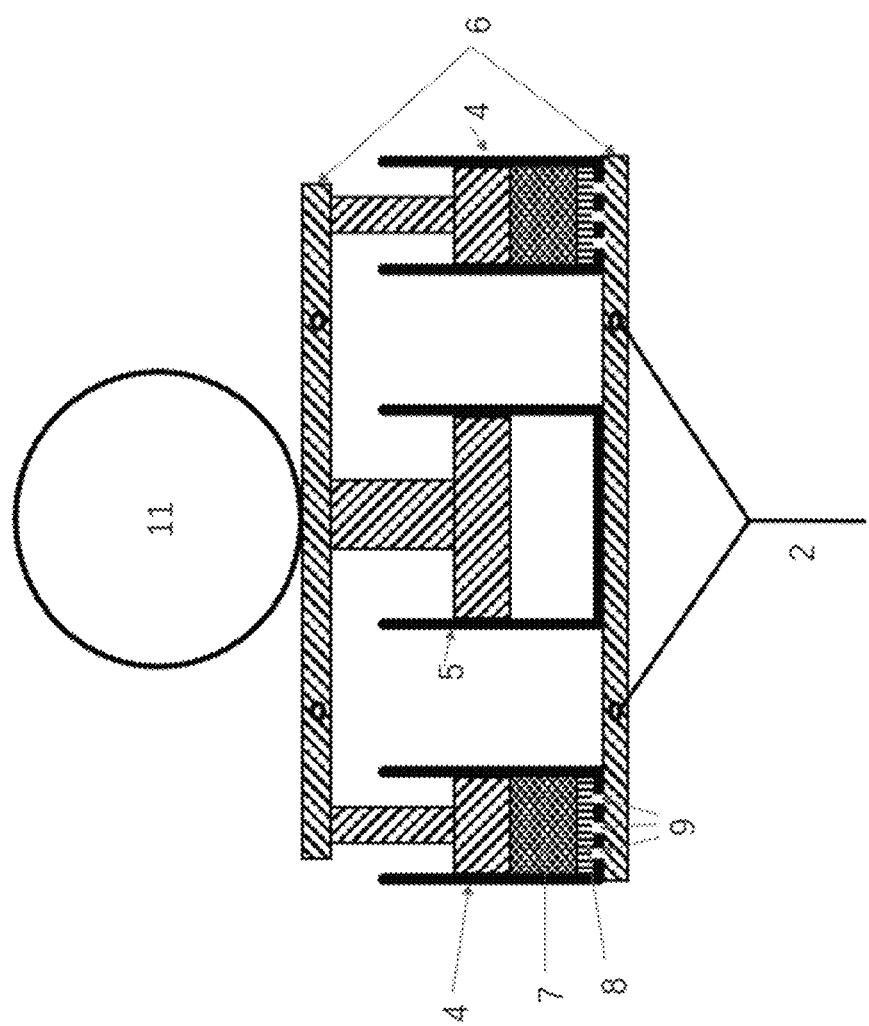
FIG. 4 is a schematic diagram of the specific composition of the negative thermal expansion body in the ocean-temperature-difference-based power generating device of the third example of the present disclosure when adopting the piston set structure.

Third Example the
Seawater-Temperature-Difference-Based Power Generating Device of which the Generator is Placed on the Seabed FIG. 3 is a schematic diagram of the structure of the generator in the ocean-temperature-difference-based power generating device of the third example of the present disclosure when being arranged on the seabed. FIG. 4 is a schematic diagram of the specific composition of the negative thermal expansion body in the ocean-temperature-difference-based power generating device of the third example of the present disclosure when adopting the piston set structure. As shown in FIG. 3 and FIG. 4, the generator is placed on the seabed at a depth of 300 meters in the South China Sea, and its rotor is connected to the fixing pulley. A rope is wound on the fixing pulley and is connected to two identical thermally-expandable or contractible bodies, which are still defined as the negative thermal expansion body A and the negative thermal expansion body B. The negative thermal expansion body of this embodiment is exemplified based on the second embodiment with the spring removed, and an incompressible hollow steel ball 11 is welded on the beam 6 at the top to provide additional buoyancy, making the buoyancy of the negative thermal expansion body to be always greater than the gravity, as shown in FIG. 4 for details.

The temperature at 10 meters below the sea surface is 28° C., and the seabed temperature is 13° C. The negative thermal expansion body A was hung over at 10 meters below the sea surface, and the negative thermal expansion body B was hung over at 1 meter above the seabed. Initially, the fixing pulley was stuck, and after waiting for 30 minutes, the tension of the fishing line on the negative thermal expansion body B side is 40 N greater than that of the fishing line on the negative thermal expansion body A side. Thereafter, the fixing pulley was released, the negative thermal expansion body B floated up, and the negative thermal expansion body A was sank, driving the fixing pulley to rotate, and the generator generated power, the output power was approx. 90 W. After 82 seconds, the negative thermal expansion body B floated up to 10 meters below the sea surface, its temperature was still very low, and its volume was still relatively large. The fixing pulley was stuck, and after 30 minutes of heat exchange, the cross-linked copolymer particles of N-isopropylacrylamide and N-tert-butylacrylamide in the negative thermal expansion body B dehydrated and contracted. Under the action of water pressure, the water-permeable piston and the airtight piston were all contracted. Under the circumstances, the tension of the fishing line on the negative thermal expansion body A side is 40 N greater than that of the fishing line on the negative thermal expansion body B side. Thereafter, the fixing pulley was released, and power may be generated again.

In practice, in the piston set structure of the present disclosure, when the piston chamber of the airtight piston is in a vacuumed state, the spring may be omitted. When the structure of the piston set moves to the sea surface, after waiting for a time period long enough, the volume of the thermosensitive polymer is contracted, and the volume of the airtight piston naturally decreases under the action of the external atmospheric pressure, and the overall buoyancy decreases.

The gallium-indium alloy and thermosensitive polymer of the present disclosure need a time period long enough for heat exchange, and the time required for the negative thermal expansion body to float or sink in seawater is much less than the time required for it to complete heat exchange. Therefore, in the floating or sinking process of the negative thermal expansion body, the change of its volume may be neglected.

The average density mentioned in the present disclosure is obtained by dividing the total mass by the total volume.

Specifically, the present disclosure provides a negative thermal expansion body, which includes a flexible and elastic deformable container, and a phase-change material accommodated in a container. The phase-change material becomes crystallized when cooled and may change from a liquid state to a solid state. The liquid phase-change material has soluble gas dissolved therein. The crystallization temperature of the phase-change material is between 4° C. and 40° C. The phase-change material is crystallized when its temperature is lowered, and the soluble gas in the phase-change material is emitted, which causes the total volume of the deformable container expands. The crystallized phase-change material melts into a liquid state when its temperature rises, and dissolves and absorbs the emitted gas into the phase-change material itself, which causes the total volume of the deformable container to contract. The phase-change material is one or more of sulfolane, ethylene carbonate, capric acid, dimethyl sulfoxide, lauryl alcohol and low-melting point paraffin, and the low-melting point paraffin refers to C18 paraffin. The soluble gas includes one or more of carbon dioxide, methane, ethane and propane, and the mass of the dissolved and absorbed soluble gas is greater than 20% of the maximum solubility of the soluble gas at the melting point of the corresponding phase-change material. The deformable container is an aluminum-plastic film, a rubber bag or a syringe needle.

The phase-change material and deformable container in different combinations will be further described in detail below in conjunction with specific examples. These examples are prepared under laboratory conditions, and in practical engineering applications, the dosage and volume may be increased in equal proportions.

Fourth Example Sulfolane+Carbon Dioxide System 20 mL of sulfolane (melting point: 28.5° C.) was heated to 29° C. to make it in a liquid state, and 50 mL of carbon dioxide gas was introduced under normal pressure to obtain a phase-change material. 1 milliliter of phase-change material was drawn with a syringe needle, the needle was sealed with adhesive, and cooled to 15° C. After keeping for 10 hours, it may be observed that sulfolane crystallized, and dissolved carbon dioxide precipitated out. The piston of the syringe needle was pushed open, the total volume of the carbon dioxide and sulfolane was increased to 3.5 mL. After the temperature returned to 29° C. and keeping for 10 hours, it may be observed that the sulfolane melted into a liquid, the precipitated carbon dioxide was dissolved, and the volume was restored to 1.2 mL.

Fifth Example Sulfolane+Methane System

Sulfolane (melting point: 28.5° C.) was heated to 29° C. to make it in a liquid state, methane gas was introduced to saturation. 1 mL of liquid phase-change material was drawn with a syringe needle, the needle was sealed with adhesive, and cooled to 15° C. After keeping for 10 hours, it was observed that sulfolane crystallized, and dissolved methane precipitated out. The piston of the syringe needle was pushed open, and the total volume of methane and sulfolane increased to 2.5 mL. After the temperature returned to 29° C. and keeping for 10 hours, it was observed that the sulfolane melted into a liquid, which dissolved the precipitated methane, and its volume was restored to 1.1 mL.

Sixth Example Sulfolane+Ethane System

Sulfolane (melting point: 28.5° C.) was heated to 29° C. to make it in a liquid state, ethane gas was introduced to saturation. 1 mL of liquid phase-change material was drawn with a syringe needle, the needle was sealed with adhesive, and cooled to 15° C. After keeping for 10 hours, it was observed that sulfolane crystallized, and dissolved methane precipitated out. The piston of the syringe needle was pushed open, and the total volume of ethane and sulfolane increased to 2.2 mL. After the temperature returned to 29° C. and keeping for 10 hours, it was observed that the sulfolane melted into a liquid, which dissolved the precipitated ethane, and its volume was restored to 1 mL.

Seventh Example Sulfolane+Propane System

Sulfolane (melting point: 28.5° C.) was heated to 29° C. to make it in a liquid state, propane gas was introduced to saturation. 1 mL of liquid phase-change material was drawn with a syringe needle, the needle was sealed with adhesive, and cooled to 15° C. After keeping for 10 hours, it was observed that sulfolane crystallized, and dissolved propane precipitated out. The piston of the syringe needle was pushed open, and the total volume of propane and sulfolane increased to 2.8 mL. After the temperature returned to 29° C. and keeping for 10 hours, it was observed that the sulfolane melted into a liquid, which dissolved the precipitated propane, and its volume was restored to 1.5 mL.

Eighth Example Ethylene Carbonate+Carbon Dioxide System

Ethylene carbonate (melting point: 35° C.) was heated to 36° C. to make it in a liquid state, carbon dioxide gas was introduced to saturation. 1 mL of liquid phase-change material was drawn with a syringe needle, the needle was sealed with adhesive, and cooled to 22° C. After keeping for 10 hours, it was observed that ethylene carbonate crystallized, and dissolved carbon dioxide precipitated out. The piston of the syringe needle was pushed open, and the total volume of carbon dioxide and ethylene carbonate increased to 2.4 mL. After the temperature returned to 36° C. and keeping for 10 hours, it was observed that the ethylene carbonate melted into a liquid, which dissolved the precipitated carbon dioxide, and its volume was restored to 1.2 mL.

Ninth Example Ethylene Carbonate+Methane System

Ethylene carbonate (melting point: 35° C.) was heated to 36° C. to make it in a liquid state, methane gas was introduced to saturation. 1 mL of liquid phase-change material was drawn with a syringe needle, the needle was sealed with adhesive, and cooled to 22° C. After keeping for 10 hours, it was observed that ethylene carbonate crystallized, and dissolved methane precipitated out. The piston of the syringe needle was pushed open, and the total volume of methane and ethylene carbonate increased to 2 mL. After the temperature returned to 36° C. and keeping for hours, it was observed that the ethylene carbonate melted into a liquid, which dissolved the precipitated methane, and its volume was restored to 1.2 mL.

Tenth Example Ethylene Carbonate+Ethane System

Ethylene carbonate (melting point: 35° C.) was heated to 36° C. to make it in a liquid state, ethane gas was introduced to saturation. 1 mL of liquid phase-change material was drawn with a syringe needle, the needle was sealed with adhesive, and cooled to 22° C. After keeping for 10 hours, it was observed that ethylene carbonate crystallized, and dissolved ethane precipitated out. The piston of the syringe needle was pushed open, and the total volume of ethane and ethylene carbonate increased to 2.2 mL. After the temperature returned to 36° C. and keeping for 10 hours, it was observed that the ethylene carbonate melted into a liquid, which dissolved the precipitated ethane, and its volume was restored to 1.3 mL.

Eleventh Example Ethylene Carbonate+Propane System

Ethylene carbonate (melting point: 35° C.) was heated to 36° C. to make it in a liquid state, propane gas was introduced to saturation. 1 mL of liquid phase-change material was drawn with a syringe needle, the needle was sealed with adhesive, and cooled to 22° C. After keeping for 10 hours, it was observed that ethylene carbonate crystallized, and dissolved propane precipitated out. The piston of the syringe needle was pushed open, and the total volume of propane and ethylene carbonate increased to 2.2 mL. After the temperature returned to 36° C. and keeping for 10 hours, it was observed that the ethylene carbonate melted into a liquid, which dissolved the precipitated propane, and its volume was restored to 1.3 mL.

Twelfth Example Capric Acid+Carbon Dioxide System

Capric acid (melting point: 31.5° C.) was heated to 33° C. to make it in a liquid state, carbon dioxide gas was introduced to saturation. 1 mL of liquid phase-change material was drawn with a syringe needle, the needle was sealed with adhesive, and cooled to 18° C. After keeping for 10 hours, it was observed that capric acid crystallized, and dissolved carbon dioxide precipitated out. The piston of the syringe needle was pushed open, and the total volume of carbon dioxide and capric acid increased to 2 mL. After the temperature returned to 33° C. and keeping for 10 hours, it was observed that the capric acid melted into a liquid, which dissolved the precipitated carbon dioxide, and its volume was restored to 1.5 mL.

Thirteenth Example Capric Acid+Methane System

Capric acid (melting point: 31.5° C.) was heated to 33° C. to make it in a liquid state, methane gas was introduced to saturation. 1 mL of liquid phase-change material was drawn with a syringe needle, the needle was sealed with adhesive, and cooled to 18° C. After keeping for 10 hours, it was observed that capric acid crystallized, and dissolved methane precipitated out. The piston of the syringe needle was pushed open, and the total volume of methane and capric acid increased to 2.5 mL. After the temperature returned to 33° C. and keeping for 10 hours, it was observed that the capric acid melted into a liquid, which dissolved the precipitated methane, and its volume was restored to 1.4 mL.

Fourteenth Example Capric Acid+Ethane System

Capric acid (melting point: 31.5° C.) was heated to 33° C. to make it in a liquid state, ethane gas was introduced to saturation. 1 mL of liquid phase-change material was drawn with a syringe needle, the needle was sealed with adhesive, and cooled to 18° C. After keeping for 10 hours, it was observed that capric acid crystallized, and dissolved ethane precipitated out. The piston of the syringe needle was pushed open, and the total volume of ethane and capric acid increased to 1.8 mL. After the temperature returned to 33° C. and keeping for 10 hours, it was observed that the capric acid melted into a liquid, which dissolved the precipitated ethane, and its volume was restored to 1.6 mL.

Fifteenth Example Capric Acid+Propane System

Capric acid (melting point: 31.5° C.) was heated to 33° C. to make it in a liquid state, propane gas was introduced to saturation. 1 mL of liquid phase-change material was drawn with a syringe needle, the needle was sealed with adhesive, and cooled to 18° C. After keeping for 10 hours, it was observed that capric acid crystallized, and dissolved propane precipitated out. The piston of the syringe needle was pushed open, and the total volume of propane and capric acid increased to 1.7 mL. After the temperature returned to 33° C. and keeping for 10 hours, it was observed that the capric acid melted into a liquid, which dissolved the precipitated propane, and its volume was restored to 1.2 mL.

Sixteenth Example Dimethyl sulfoxide+Carbon Dioxide System

Dimethyl sulfoxide (melting point: 18.5° C.) was heated to 19° C. to make it in a liquid state, carbon dioxide gas was introduced to saturation. 1 mL of liquid phase-change material was drawn with a syringe needle, the needle was sealed with adhesive, and cooled to 5° C. After keeping for 10 hours, it was observed that dimethyl sulfoxide crystallized, and dissolved carbon dioxide precipitated out. The piston of the syringe needle was pushed open, and the total volume of carbon dioxide and dimethyl sulfoxide increased to 2.5 mL. After the temperature returned to 19° C. and keeping for 10 hours, it was observed that the dimethyl sulfoxide melted into a liquid, which dissolved the precipitated carbon dioxide, and its volume was restored to 1.5 mL.

Seventeenth Example Dimethyl sulfoxide+Methane System

Dimethyl sulfoxide (melting point: 18.5° C.) was heated to 19° C. to make it in a liquid state, methane gas was introduced to saturation. 1 mL of liquid phase-change material was drawn with a syringe needle, the needle was sealed with adhesive, and cooled to 5° C. After keeping for hours, it was observed that dimethyl sulfoxide crystallized, and dissolved methane precipitated out. The piston of the syringe needle was pushed open, and the total volume of dimethyl sulfoxide and methane increased to 1.8 mL. After the temperature returned to 19° C. and keeping for 10 hours, it was observed that the dimethyl sulfoxide melted into a liquid, which dissolved the precipitated methane, and its volume was restored to 1.0 mL.

Eighteenth Example Dimethyl sulfoxide+Ethane System

Dimethyl sulfoxide (melting point: 18.5° C.) was heated to 19° C. to make it in a liquid state, ethane gas was introduced to saturation. 1 mL of liquid phase-change material was drawn with a syringe needle, the needle was sealed with adhesive, and cooled to 5° C. After keeping for hours, it was observed that dimethyl sulfoxide crystallized, and dissolved ethane precipitated out. The piston of the syringe needle was pushed open, and the total volume of ethane and dimethyl sulfoxide increased to 2.2 mL. After the temperature returned to 19° C. and keeping for hours, it was observed that the dimethyl sulfoxide melted into a liquid, which dissolved the precipitated ethane, and its volume was restored to 1.3 mL.

Nineteenth Example Dimethyl sulfoxide+Propane System

Dimethyl sulfoxide (melting point: 18.5° C.) was heated to 19° C. to make it in a liquid state, propane gas was introduced to saturation. 1 mL of liquid phase-change material was drawn with a syringe needle, the needle was sealed with adhesive, and cooled to 5° C. After keeping for hours, it was observed that dimethyl sulfoxide crystallized, and dissolved propane precipitated out. The piston of the syringe needle was pushed open, and the total volume of propane and dimethyl sulfoxide increased to 2.4 mL. After the temperature returned to 19° C. and keeping for hours, it was observed that the dimethyl sulfoxide melted into a liquid, which dissolved the precipitated propane, and its volume was restored to 1.7 mL.

Twentieth Example Lauryl Alcohol+Carbon Dioxide System

Lauryl alcohol (melting point: 24° C.) was heated to 25° C. to make it in a liquid state, carbon dioxide gas was introduced to saturation. 1 mL of liquid phase-change material was drawn with a syringe needle, the needle was sealed with adhesive, and cooled to 10° C. After keeping for 10 hours, it was observed that lauryl alcohol crystallized, and dissolved carbon dioxide precipitated out. The piston of the syringe needle was pushed open, and the total volume of carbon dioxide and lauryl alcohol increased to 1.5 mL. After the temperature returned to 25° C. and keeping for 10 hours, it was observed that the lauryl alcohol melted into a liquid, which dissolved the precipitated carbon dioxide, and its volume was restored to 1.3 mL.

Twenty-First Example Lauryl Alcohol+Methane System

Lauryl alcohol (melting point: 24° C.) was heated to 25° C. to make it in a liquid state, methane gas was introduced to saturation. 1 mL of liquid phase-change material was drawn with a syringe needle, the needle was sealed with adhesive, and cooled to 10° C. After keeping for 10 hours, it was observed that lauryl alcohol crystallized, and dissolved methane precipitated out. The piston of the syringe needle was pushed open, and the total volume of methane and lauryl alcohol increased to 1.8 mL. After the temperature returned to 25° C. and keeping for 10 hours, it was observed that the lauryl alcohol melted into a liquid, which dissolved the precipitated methane, and its volume was restored to 1.5 mL.

Twenty-Second Example Lauryl Alcohol+Ethane System

Lauryl alcohol (melting point: 24° C.) was heated to 25° C. to make it in a liquid state, ethane gas was introduced to saturation. 1 mL of liquid phase-change material was drawn with a syringe needle, the needle was sealed with adhesive, and cooled to 10° C. After keeping for 10 hours, it was observed that lauryl alcohol crystallized, and dissolved ethane precipitated out. The piston of the syringe needle was pushed open, and the total volume of ethane and lauryl alcohol increased to 2 mL. After the temperature returned to 25° C. and keeping for 10 hours, it was observed that the lauryl alcohol melted into a liquid, which dissolved the precipitated ethane, and its volume was restored to 1.5 mL.

Twenty-Third Example Lauryl Alcohol+Propane System

Lauryl alcohol (melting point: 24° C.) was heated to 25° C. to make it in a liquid state, propane gas was introduced to saturation. 1 mL of liquid phase-change material was drawn with a syringe needle, the needle was sealed with adhesive, and cooled to 10° C. After keeping for 10 hours, it was observed that lauryl alcohol crystallized, and dissolved propane precipitated out. The piston of the syringe needle was pushed open, and the total volume of propane and lauryl alcohol increased to 1.9 mL. After the temperature returned to 25° C. and keeping for 10 hours, it was observed that the lauryl alcohol melted into a liquid, which dissolved the precipitated propane, and its volume was restored to 1.4 mL.

Twenty-Fourth Example Low-Melting Point Paraffin+Carbon Dioxide System

Low-melting point paraffin (melting point: 28° C.) was heated to 29° C. to make it in a liquid state, carbon dioxide gas was introduced to saturation. 1 mL of liquid phase-change material was drawn with a syringe needle, the needle was sealed with adhesive, and cooled to 15° C. After keeping for 10 hours, it was observed that low-melting point paraffin crystallized, and dissolved carbon dioxide precipitated out. The piston of the syringe needle was pushed open, and the total volume of carbon dioxide and low-melting point paraffin increased to 1.5 mL. After the temperature returned to 29° C. and keeping for 10 hours, it was observed that the low-melting point paraffin melted into a liquid, which dissolved the precipitated carbon dioxide, and its volume was restored to 1.2 mL.

Twenty-Fifth Example Low-Melting Point Paraffin+Methane System

Low-melting point paraffin (melting point: 28° C.) was heated to 29° C. to make it in a liquid state, methane gas was introduced to saturation. 1 mL of liquid phase-change material was drawn with a syringe needle, the needle was sealed with adhesive, and cooled to 15° C. After keeping for 10 hours, it was observed that low-melting point paraffin crystallized, and dissolved methane precipitated out. The piston of the syringe needle was pushed open, and the total volume of methane and low-melting point paraffin increased to 2 mL. After the temperature returned to 29° C. and keeping for 10 hours, it was observed that the low-melting point paraffin melted into a liquid, which dissolved the precipitated methane, and its volume was restored to 1.6 mL.

Twenty-Sixth Example Low-Melting Point Paraffin+Ethane System

Low-melting point paraffin (melting point: 28° C.) was heated to 29° C. to make it in a liquid state, ethane gas was introduced to saturation. 1 mL of liquid phase-change material was drawn with a syringe needle, the needle was sealed with adhesive, and cooled to 15° C. After keeping for 10 hours, it was observed that low-melting point paraffin crystallized, and dissolved ethane precipitated out. The piston of the syringe needle was pushed open, and the total volume of ethane and low-melting point paraffin increased to 1.5 mL. After the temperature returned to 29° C. and keeping for 10 hours, it was observed that the low-melting point paraffin melted into a liquid, which dissolved the precipitated ethane, and its volume was restored to 1.4 mL.

Twenty-Seventh Example Low-Melting Point Paraffin+Propane System

Low-melting point paraffin (melting point: 28° C.) was heated to 29° C. to make it in a liquid state, propane gas was introduced to saturation. 1 mL of liquid phase-change material was drawn with a syringe needle, the needle was sealed with adhesive, and cooled to 15° C. After keeping for 10 hours, it was observed that low-melting point paraffin crystallized, and dissolved propane precipitated out. The piston of the syringe needle was pushed open, and the total volume of propane and low-melting point paraffin increased to 1.7 mL. After the temperature returned to 29° C. and keeping for 10 hours, it was observed that the low-melting point paraffin melted into a liquid, which dissolved the precipitated propane, and its volume was restored to 1.4 mL.

Twenty-Eighth Example Sulfolane+Carbon Dioxide+Poly N-Isopropylacrylamide System Sulfolane (melting point: 28.5° C.) was mixed with monomer N-isopropylacrylamide at a molar ratio of 1:3 at 30° C. Then, a cross-linking agent N,N-methylenebis acrylamide was added to the monomer solution, and ammonium persulfate was adopted as an initiator. The molar ratio of the monomer to the cross-linking agent is 1:0.01; the molar ratio of the monomer to the initiator is 1:0.005. The temperature was raised to 50° C. to make the mixture crosslinked to form a gel system, the gel was chopped to particles with a diameter of about 2 mm, and carbon dioxide gas was introduced to saturation to obtain a phase-change material. 1 mL of gel was drawn with a syringe needle, the needle was sealed with adhesive, and cooled to 15° C. After keeping for 10 hours, it was observed that the gel underwent a phase transition, and dissolved carbon dioxide was precipitated. The piston of the syringe needle was pushed open, and the total volume of gel increased to 3.5 mL. After the temperature returned to 29° C. and keeping for 10 hours, it was observed that the gel also dissolved the precipitated carbon dioxide, and its volume was restored to 1.1 mL.

Twenty-Ninth Example Sulfolane+Carbon Dioxide+Glass Fiber System mL of sulfolane (melting point: 28.5° C.) was heated to 29° C. to make it in a liquid state, 50 mL of carbon dioxide gas was introduced. 1 mL of liquid phase-change material was drawn with a syringe needle, and injected into an aluminium-plastic film bag. There was 1 cm² Geade GF/D glass fiber in the aluminium-plastic film bag, and finally the aluminium-plastic film bag was heat-sealed and cooled to 15° C. After keeping for 10 hours, it was observed that sulfolane crystallized, and dissolved carbon dioxide precipitated out. The total volume of carbon dioxide and sulfolane increased to 3.5 mL. After the temperature returned to 29° C. and keeping for 10 hours, it was observed that the sulfolane melted into a liquid, which dissolved the precipitated carbon dioxide, and its volume was restored to 1 mL.

In the above embodiments, the mass of the soluble gas is greater than 20% of the maximum solubility of the soluble gas at the melting point of the corresponding phase-change material. If the volume of the dissolved soluble gas is small, the volume of the negative thermal expansion body after cooling is small, which will reduce the power generating efficiency. If the volume of the dissolved soluble gas is large, it will cause damage to the packaging of the negative thermal expansion body. In actual engineering practice, it is necessary to dissolve some more soluble gas as appropriate.

Figure 5:
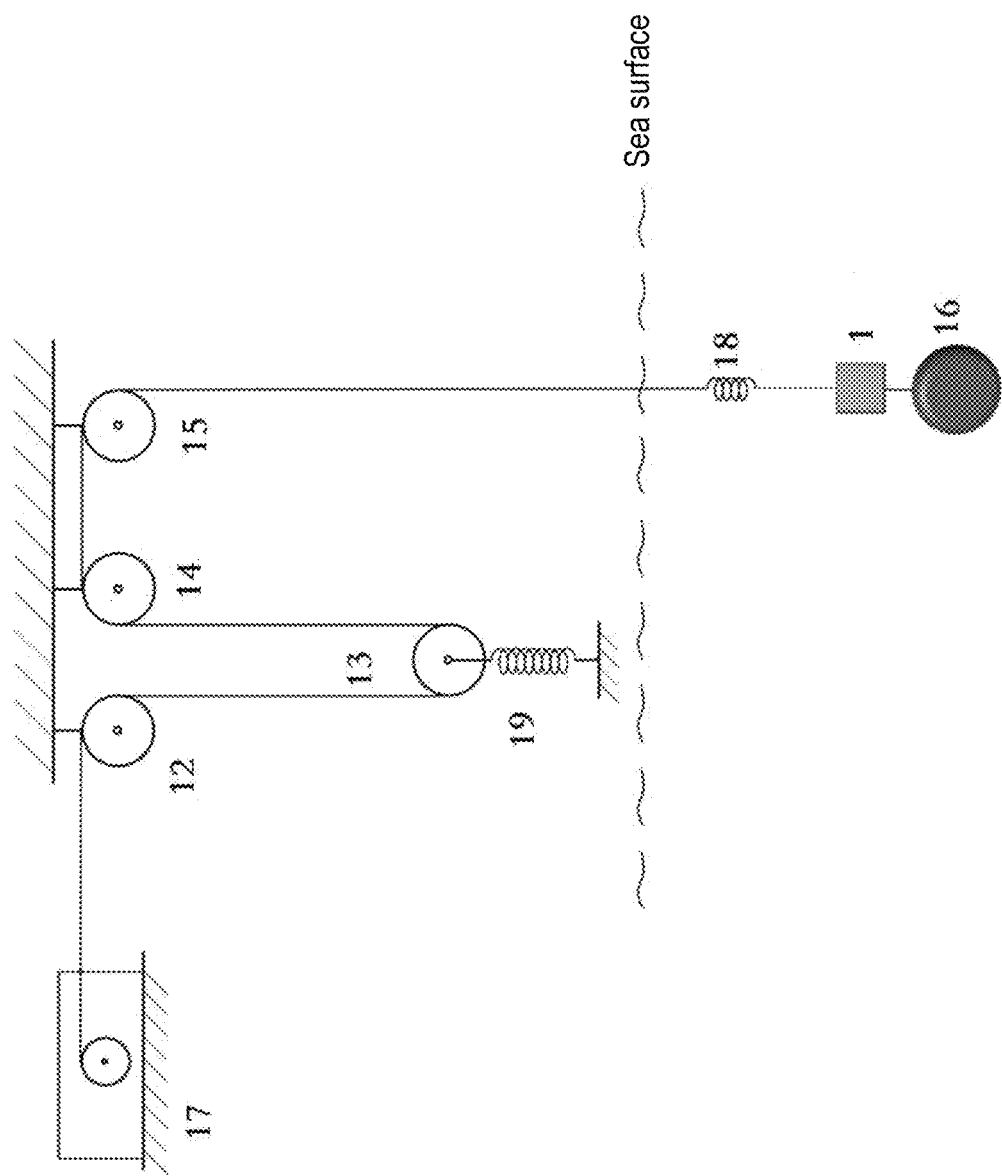
FIG. 5 is a schematic diagram of the main structure of the ocean-temperature-difference-based power generating device in an embodiment of the present disclosure.

Thirtieth Example Sulfolane+Carbon Dioxide+Ocean-Temperature-Difference-Based Power Generating Device FIG. 5 is a schematic diagram of the structure of a motor/generator in the ocean-temperature-difference-based power generating device in an embodiment of the present disclosure when be disposed at the sea surface. As shown in FIG. 5, the motor/generator 17 is placed at the sea surface, and specifically, may be set on a ship or a floating platform, and the rope is wound on the first fixing pulley 12, the first movable pulley 13, the second fixing pulley 14, and the third fixing pulley 15 in sequence, and then connected to the negative thermal expansion body 1 and a heavy object (the heavy object is a titanium metal ball 16, which serves to keep the rope in a tensioned state). A spring buffer 18 is disposed between the third fixing pulley 15 and the rope of the negative thermal expansion body, and serves a certain buffering effect on the flow of seawater and the up-and-down movement of the heavy object. A spring dynamometer 19 is hung below the first movable pulley 13, and the other end of the spring dynamometer is fixed. The negative thermal expansion body in this example includes a cold crystallizable liquid, and which is sulfolane. Sulfolane (melting point: 28.5° C.) was heated to 29° C. to make it in a liquid state, and 400 mL of carbon dioxide gas was introduced. The deformable outer packaging thereof is aluminium-plastic film. A concave with a length and width of 10 cm and a depth of 2 cm was punched out by an aluminium-plastic film forming machine on the left side of the aluminium-plastic film, and the two sides of the aluminium-plastic film were folded and sealed. 200 mL of liquid was drawn with a syringe needle and injected into the aluminium-plastic film bag from the third side, and finally the bag was sealed. The heavy object is a titanium ball with a radius of 9.7 cm and a weight of 1.33 kg. The rope is made of 8-strand braided PE fishing line with a diameter of 0.2 mm.

Figure 6:
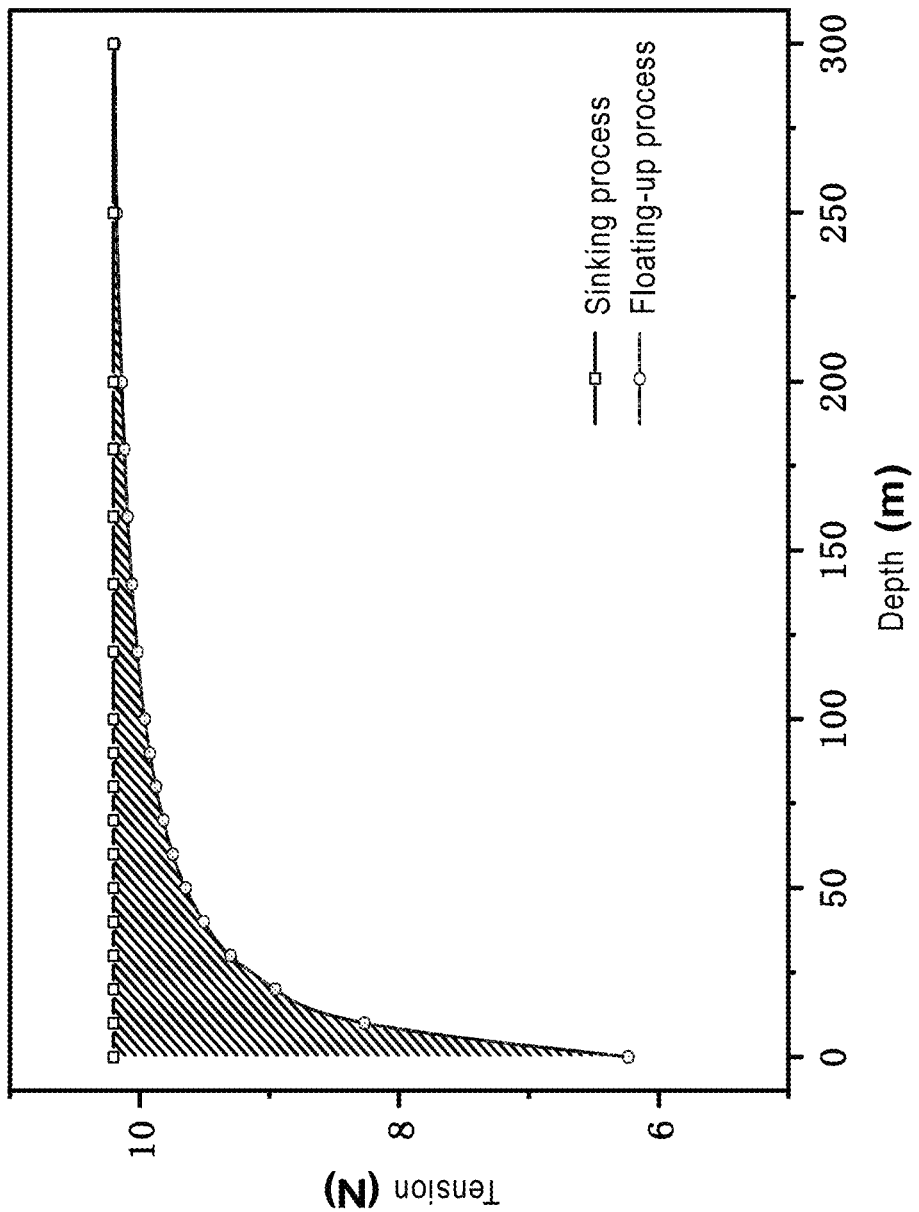
FIG. 6 is a graph showing the relationship between the rope tension and the depth in the device of FIG. 5.

The test was carried out on the ocean near Haikou at 110° east longitude and 20° north latitude. The sea surface temperature was 29° C., and the temperature at a depth of 300 m under the sea was 13° C. The negative thermal expansion body and heavy object were hung over on the sea surface, and the tension of rope measured by the spring dynamometer is about 10.2 N. During the sinking process, the negative thermal expansion body was controlled to descend at a constant speed of 1.2 m/s and drive the generator to generate power, supplying 3060 J of energy to the generator. After 250 s, the aluminium-plastic bag sank to 300 m. The fixing pulley was stuck. After keeping for 10 hours, the carbon dioxide in the sulfolane was completely precipitated. When the carbon dioxide in the sulfolane was completely precipitated, its volume at room temperature should be 400 ml. However, in actual engineering practice, the entire negative thermal expansion body is at a depth of 300 meters. In the cold seawater, the gas is compressed, and the pressure at this depth is about 3.1 MPa, and the carbon dioxide gas released under the circumstances will be compressed to 12 ml. Moreover, the volume of sulfolane itself will shrink due to the coldness. Due to such offset, in practice, the volume change of the negative thermal expansion body is negligible. Under the circumstances, the tension of the rope measured by the spring dynamometer is about 10.19 N. The fixing pulley is released, and the motor is adopted to drive the fixing pulley to rotate, and the negative thermal expansion body is pulled to the sea surface at a speed of 0.2 m/s, which consumes 2956 J of energy. During the rising process, as the pressure continues to decrease, the compressed carbon dioxide gas gradually expands, and the volume of the entire negative thermal expansion body gradually increases as rising, and the difference between its own buoyancy and gravity becomes smaller. In reflection of the above changes, the tension of the rope is also gradually decreased, and the relationship between the tension of the rope and the depth is shown in FIG. 6. It can be seen from the figure that the energy generated during the whole process is shown in the shaded area in the figure, and the energy is about 104 J.

Regarding FIG. 6, a more detailed analysis is that the time required for the negative thermal expansion body to float or sink in seawater is much shorter than the time required to complete the phase transition. Therefore, in the sinking and rising process of the negative thermal expansion body, the change of its volume is negligible. Specifically, the rising and sinking times are relatively short, and within this short period of time, it may be considered that no crystallization or melting occurs. During the sinking process, the gas is already dissolved in the gel, and the volume change of the gel caused by the compression of seawater is negligible. The gravity of negative thermal expansion body remains unchanged, its volume remains unchanged, and the difference in buoyancy remains unchanged, so the tension remains unchanged. A different condition applies to the rising process. After a long time of immersion in deep sea and low temperature, the gas dissolved in the gel has been precipitated, but in the deep sea, the gas is compressed, and the gel itself will expand and contract due to low temperature, and the volume will be slightly reduced. Due to such offset, in practice, the overall volume change of the negative thermal expansion body is also negligible. Therefore, the deeper the sea depth is, the smaller the actual volume change is, and the smaller the difference between gravity and buoyancy is; therefore, the closer the difference is to the difference in the sinking process. However, as the negative thermal expansion body slowly floats up to the sea surface, the pressure of the seawater becomes smaller, the compression force on the gas is also reduced, the volume gradually increases, the buoyancy increases, the difference between gravity and buoyancy also becomes larger, and the tension becomes smaller.

It is easy for those skilled in the art to understand that the above descriptions are only preferred embodiments of the present disclosure, and are not intended to limit the present disclosure. Any modifications, equivalent replacements and improvements made within the spirit and principles of the present disclosure should all be included within the scope to be protected by the present disclosure.

What is claimed is:

1. A power generating device based on an ocean temperature difference, comprising:
a negative thermal expansion body, a rope, and a generator, wherein the negative thermal expansion body is connected with the rope, and the rope is connected with the generator,
the negative thermal expansion body is in a contracted state in hotter upper seawater close to a sea surface, and a difference of gravity minus buoyancy is relatively large, the negative thermal expansion body is in an expanded state in colder deep seawater, and the difference the gravity minus the buoyancy is relatively small, during an operation process, the negative thermal expansion body in the colder deep seawater becomes expanded and buoyant after a heat exchange, and become expanded and gradually become fully expanded when floating up in order to be able to gradually increase the buoyancy in the process of floating up, when the negative thermal expansion body floats up to the hotter upper seawater, after the heat exchange, the negative thermal expansion body changes back to a contracted state, the buoyancy becomes smaller, and the negative thermal expansion body sinks back into the deep seawater, during the floating process and the sinking process, a total work done by a resultant force of the gravity and the buoyancy is positive, and the negative thermal expansion body floats or sinks in seawater to drive the rope to move, and the generator is pulled by the rope to realize power generation.

2. The power generating device based on the ocean temperature difference according to claim 1, wherein the negative thermal expansion body comprises a flexible and elastic deformable container, and a phase-change material accommodated in the deformable container and crystallized when cooled and being able to change from a liquid state to a solid state, the liquid phase-change material has a soluble gas dissolved therein, a crystallization temperature of the phase-change material is between 4° C. and 40° C., the phase-change material is crystallized when its temperature is lowered, and the soluble gas in the phase-change material is emitted, which causes a total volume of the deformable container expands, the crystallized phase-change material melts into a liquid state when its temperature rises, and dissolves and absorbs the emitted gas into the phase-change material itself, which causes the total volume of the deformable container to contract.

3. The power generating device based on the ocean temperature difference according to claim 2, wherein the phase-change material is one or more of sulfolane, ethylene carbonate, capric acid, dimethyl sulfoxide, lauryl alcohol and low-melting point paraffin, and the low-melting point paraffin refers to C18 paraffin.

4. The power generating device based on the ocean temperature difference according to claim 3, wherein the soluble gas comprises one or more of carbon dioxide, methane, ethane and propane, a mass of the dissolved and absorbed soluble gas is greater than 20% of a maximum solubility of the soluble gas at a melting point of the corresponding phase-change material.

5. The power generating device based on the ocean temperature difference according to claim 2, wherein the deformable container is an aluminum-plastic film, a rubber bag or a syringe needle.

6. The power generating device based on the ocean temperature difference according to claim 5, wherein the phase-change material is a gel at a set temperature, and there is a liquid at a microscopic level in the gel.

7. The power generating device based on the ocean temperature difference according to claim 6, wherein the deformable container is further accommodated with a porous material, and the phase-change material is filled in pores of the porous material.

8. The power generating device based on the ocean temperature difference according to claim 2, wherein further comprising a fixing pulley and a heavy object, wherein the generator is disposed on a ship or a floating platform, a plurality of the fixing pulleys are fixed on the sea surface, one end of the rope is connected to the generator, the rope is wound on the plurality of the fixing pulleys and the other end thereof is connected to the negative thermal expansion body, the heavy object is connected to a terminal end of the end, and serves to keep the rope in a tensioned state.

9. An operation method for the power generating device based on the ocean temperature difference according to claim 2, wherein during the operation process, the negative thermal expansion body is in the relatively hot upper seawater near the sea surface, the phase-change material is in a liquid state, and the soluble gas is dissolved therein, the negative thermal expansion body is in the contracted state as a whole with a small volume and small buoyancy, the difference between the gravity and the buoyancy remains constant, and the difference is large, in the colder deep seawater, the phase-change material crystallizes, the soluble gas is emitted, the soluble gas is compressed by the deep seawater, and a volume of the entire negative thermal expansion body changes slightly, as the negative thermal expansion body gradually floats up, a seawater pressure decreases, a volume of the compressed soluble gas gradually expands, the buoyancy increases, and the difference between the gravity and the buoyancy decreases gradually.

10. A power generating device based on an ocean temperature difference, comprising a fixing pulley, negative thermal expansion bodies, a rope, and a generator, wherein both ends of the rope are respectively provided with similar negative thermal expansion bodies, the rope is wound on the fixing pulley and drives the fixing pulley to rotate, the fixing pulley is connected to the generator, the negative thermal expansion body is in a contracted state in hotter upper seawater close to a sea surface, and a difference of gravity minus buoyancy is relatively large, the negative thermal expansion body is in an expanded state in colder deep seawater, and the difference of the gravity minus the buoyancy is relatively small, during an operation process, the negative thermal expansion bodies on the both sides of the rope have varied differences obtained by the gravity minus the buoyancy due to their temperature differences, thus driving the rope to move, and then drives the fixing pulley to rotate to realize power generation.

11. The power generating device based on the ocean temperature difference according to claim 10, wherein each of the negative thermal expansion bodies is connected with a heavy object, and an average density of a combination of the heavy object and each of the negative thermal expansion bodies is always greater than a density of the seawater, the fixing pulley and the generator are set above and near the sea surface, during an initial power generation process, the negative thermal expansion bodies at the both ends of the rope are located at the ocean surface and in the deep ocean respectively, the negative thermal expansion body on one side of the rope is in the ocean surface with a higher temperature, after a heat exchange, the negative thermal expansion body is at a relatively high-temperature state, its volume shrinks, which makes its own buoyancy smaller, the negative thermal expansion body on the other side of the rope is located in the deep ocean, after a heat exchange, the negative thermal expansion body is at a relatively low-temperature state, its volume is expanded, which makes its own buoyancy larger, and results in unbalanced force on the both sides of the rope, making the rope move and realize power generation, the above process is repeated to make the rope move up and down repeatedly, thereby realizing continuous power generation.

12. The power generating device based on the ocean temperature difference according to claim 10, wherein the generator is placed on a seabed, the fixing pulley is connected to a rotor of the generator, and the both ends of the rope are respectively provided with the similar negative thermal expansion bodies, a density of the negative thermal expansion body is always less than that of the seawater, during an initial power generation process, the negative thermal expansion bodies at the both ends of the rope are located at the ocean surface and in the deep ocean respectively, the negative thermal expansion body on one side of the rope is in the ocean surface with a higher temperature, after heat exchange, the negative thermal expansion body is at a relatively high-temperature state, its volume shrinks, which makes its own buoyancy smaller, the negative thermal expansion body on the other side of the rope is located in the deep ocean, after a heat exchange, the negative thermal expansion body is at a relatively low-temperature state, its volume is expanded, which makes its own buoyancy larger, and results in unbalanced force on the both sides of the rope, making the rope move to drive the fixing pulley to rotate and realize power generation, the above process is repeated to make the rope move up and down repeatedly, thereby realizing continuous power generation.

13. The power generating device based on the ocean temperature difference according to claim 10, wherein the negative thermal expansion bodies on the both sides of the rope is gallium-indium alloy, a mass fraction of indium in the gallium-indium alloy is 5% to 19%, a melting point is between 5° C. and 25° C.

14. The power generating device based on the ocean bemperature difference according to claim 11, wherein the negative thermal expansion bodies on the both sides of the rope are a piston set structure, the pistonset structure comprises an airtight piston, water-permeable pistons, a beam, and springs, the airtight piston, the water-permeable pistons, and the springs are arranged in parallel between two beams and perpendicular to the two beams, and piston bars of the airtight piston and the water-permeable pistons are fixed on one of the two beams, bottoms of the airtight piston and the water-permeable piston are fixed on another beam, a piston chamber of the airtight piston is in a vacuum state or filled with a gas, a piston chamber of the water-permeable pistons is filled with a thermosensitive polymer, the thermosensitive polymer has a water-absorbing and swelling characteristic at a relatively low-temperature state and has a water-dehydrating and contracting characteristic at a relatively high-temperature state.

15. The power generating device based on the ocean temperature difference according to claim 12, wherein the negative thermal expansion bodies on the both sides of the rope are a piston set structure, the piston set structure comprises an airtight piston, water-permeable pistons, a beam, and a hollow steel ball, the airtight piston and the water-permeable pistons are arranged in parallel between two beams and perpendicular to the two beams, and piston bars of the airtight piston and the water-permeable pistons are fixed on one of the two beams, bottoms of the airtight piston and the water-permeable pistons are fixed on another beam, a piston chamber of the airtight piston is in a vacuum state or filled with a gas, a piston chamber of the water-permeable pistons is filled with a thermosensitive polymer, the thermosensitive polymer has a water-absorbing and swelling characteristic at a relatively low-temperature state and has a water-dehydrating and contracting characteristic at a relatively high-temperature state, the hollow steel ball is located on a top of the upper beam, by controlling a volume of the hollow steel ball, an average density of the entire piston set structure is designed to be less than that of the seawater.

16. The power generating device based on the ocean temperature difference according to claim 14, wherein the thermosensitive polymer is a cross-linked copolymer of N-isopropylacrylamide and N-tert-butylacrylamide in a form of gel particles.

17. The power generating device based on the ocean temperature difference according to claim 16, wherein a number of the water-permeable pistons is two, and a number of the springs is two, the two water-permeable pistons are respectively arranged on both sides of the one airtight piston, and the two springs are respectively arranged on the both sides of the airtight piston, and are located between the airtight piston and the water-permeable piston, a small hole is opened at a bottom of the water-permeable piston for the seawater to pass through, wherein a porous ceramic water-permeable layer is further arranged at the bottom of the water-permeable piston, the porous ceramic water-permeable layer covers the hole, and is provided to isolate the thermosensitive polymer in the piston chamber of the water-permeable piston from marine environments, a pore diameter of the porous ceramic water-permeable layer is smaller than a diameter of the particles of the thermosensitive polymer.

18. An operation method for the power generating device based on the ocean temperature difference according to claim 10, wherein comprising the following steps:

S1: setting the negative thermal expansion body at one end of the rope at the sea surface, setting the negative thermal expansion body at the other end of the rope in the deep ocean, fixing the fixing pulley, and waiting for a set time length;

S2: measuring a tension on the ropes on both sides of the fixing pulley, after the tension on the both sides is stable, releasing fixation on the fixing pulley so that the fixing pulley is able to rotate freely under an action of the ropes to perform a first cycle of power generation;

S3: after the rope completes a full-cycle of movement, the first cycle of power generation is completed, switching positions of the negative thermal expansion bodies on the both sides of the rope in the seawater, fixing the fixing pulley, and waiting for a set time length until the tension on the ropes on the both sides of the fixing pulley remains unchanged;

S4: releasing the fixing pulley, the rope moves, and a second cycle of power generation is performed;

repeating steps S2 and S3 to realize continuous power generation.

19. The power generating device based on the ocean temperature difference according to claim 11, wherein a material of the negative thermal expansion bodies on the both sides of the rope is gallium-indium alloy, a mass fraction of indium in the gallium-indium alloy is 5% to 19%, a melting point is between 5° C. and 25° C.

20. The power generating device based on the ocean temperature difference according to claim 15, wherein the thermosensitive polymer is a cross-linked copolymer of N-isopropylacrylamide and N-tert-butylacrylamide in a form of gel particles.

\* \* \* \* \*